United States Patent [19]

Steefel

[11] Patent Number: 5,687,214

[45] Date of Patent: Nov. 11, 1997

[54] METHOD AND APPARATUS FOR REMOTE MAINTENANCE PROCEDURES

[75] Inventor: Peter Leonard Steefel, Morganville, N.J.

[73] Assignee: Lucent Technologies Inc., Murray Hill, N.J.

[21] Appl. No.: 355,713

[22] Filed: Dec. 14, 1994

[51] Int. Cl.[6] ............... H04M 1/24; H04M 3/08; H04M 11/00; H04J 1/16

[52] U.S. Cl. ............... 379/29; 379/6; 379/27; 379/53; 375/224; 370/241; 370/249

[58] Field of Search ............... 379/1, 21, 5, 26, 379/27, 29, 34, 224, 93–104; 435/67.1; 370/13, 14, 15, 244, 241, 249, 250, 248; 375/224

[56] References Cited

U.S. PATENT DOCUMENTS

| | | | |
|---|---|---|---|
| 3,571,530 | 3/1971 | Davies | 179/175.2 |
| 5,276,727 | 1/1994 | Kim et al. | 379/29 |
| 5,353,327 | 10/1994 | Adari et al. | 379/29 X |
| 5,369,690 | 11/1994 | Comfort | 379/29 X |
| 5,412,709 | 5/1995 | Jarvis et al. | 379/29 X |
| 5,440,610 | 8/1995 | Schillaci et al. | 379/29 X |
| 5,452,339 | 9/1995 | Siu et al. | 379/29 X |
| 5,495,516 | 2/1996 | Lee et al. | 379/29 X |

*Primary Examiner*—Curtis Kuntz
*Assistant Examiner*—Paul Loomis
*Attorney, Agent, or Firm*—Christopher N. Malvone

[57] ABSTRACT

A programmable multi-function telecommunications device starts a timer when it detects a first signaling signal, such as a test signal, on a communication channel. If a second signaling signal, such as a ring signal, is detected during a predetermined time period measured by the timer, the information following the ring signal is automatically used for a maintenance function or for program memory upgrade. If the ring signal is not detected during the predetermined time period, the information following the ring signal is provided to the equipment's user interface in a conventional fashion.

2 Claims, 1 Drawing Sheet

METHOD AND APPARATUS FOR REMOTE MAINTENANCE PROCEDURES

BACKGROUND OF THE INVENTION

1. Field of the Invention

The present invention relates to communications; more specifically, using a communication system for remote maintenance of upgrades of terminal equipment.

2. Description of the Related Art

In the past, end terminals such as multiple function telephones were upgraded by dispatching a technician to physically change or reprogram the memory modules containing the software that controls the equipment. Dispatching a technician was a slow costly process for upgrading terminal equipment. When the end terminal was a computer, software upgrades were downloaded to the computer using a communication channel between the end terminal and the upgrade provider. Opening this communication channel required action on the part of the computer user or end terminal user. For example, the end terminal user would use a modem in his/her computer to make contact with the service provider, and then after the user entered the appropriate commands, the service provider would download a software upgrade. Requiring an end terminal user to enter commands or to perform tasks in order to upgrade the equipment, was an inconvenience to the terminal user. In the case of sophisticated equipment where the terminal user has minimal technical know how, the terminal user may not be able to execute the proper commands in order to perform an upgrade. In addition, if a single person is responsible for upgrading a large number of end terminals such as in an office building, requiring user interaction for upgrading each terminal is time consuming and disruptive to the end user.

SUMMARY OF THE INVENTION

The present invention facilitates remote testing or upgrading software or firmware of an end terminal without requiring the assistance of the end terminal user. This offers the advantage of relieving the end terminal user of the complicated tasks that are sometimes involved with equipment upgrades. In addition, the present invention permits a service provider to upgrade a large number of terminals without requiring action on the part of the end terminal's user or systems administrator. Yet another advantage of the present invention is the use of existing communications system infrastructure to arm the end terminal equipment to receive a maintenance call.

In one embodiment of the invention, the end terminal detects a signaling signal provided by the communication channel. When the end terminal detects the signaling signal, it starts a timer which is used to determine if a second signaling signal is received by the end terminal before the timer indicates that a predetermined amount of time has expired. If the second signaling signal is received before the predetermined time expires, the end terminal automatically opens a communication channel intended for remote maintenance, and mutes the communication to the terminal's internal computing device such as a microprocessor. The microprocessor uses the information received over the communication channel to perform maintenance procedures. Maintenance procedures include actions such as performing tests, collecting and/or transmitting data such as performance data, enabling features or options, and upgrading software or firmware. If the second signaling signal is not received before the predetermined time expires, the next signaling signal is responded to in a normal fashion, e.g., by activating a ringer if the terminal is a telephone.

DETAILED DESCRIPTION OF THE INVENTION

Figure 1:
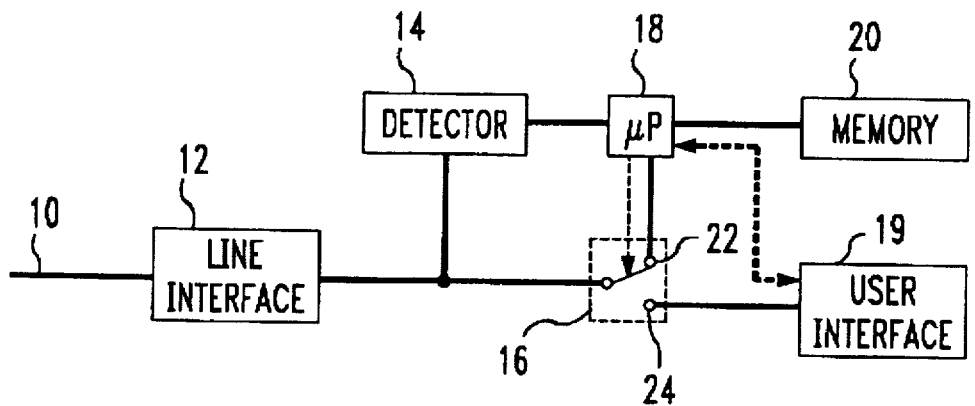
FIG. 1 illustrates a block diagram of an end terminal.

FIG. 1 illustrates an embodiment of the invention where an end terminal, such as a programmable or multifunction telephone, receives signals from communication channel 10. The signals from communication channel 10 are received by line interface 12 which provides an output to detector 14 and switch 16. Line interface 12 may be implemented in several forms. If communication channel 10 is implemented with the well-known tip and ring lines, interface unit 12 is the well-known hybrid circuit. If communication channel 10 is implemented using a well-known standard digital interface such as ISDN (Integrated Service Digital Network) or a vendor specific digital interface such as AT&T's Digital Communications Protocol (DCP), interface unit 12 is a digital interface compatible with that standard. Switch 16 when in a first position supplies the signal from line interface unit 12 to microprocessor 18, and when in a second position, supplies the signal from line interface 12 to user interface 19. User interface 19 may be implemented using components such as a message memory, a fax machine, a modem, a simple handset, a speaker, a microphone or other device associated with the normal function of the end terminal equipment. Microprocessor 18, communicates with user interface 19 for purposes such as control, and uses memory 20 for program storage and scratch pad memory. Memory 20 may comprise read only memory random access memory, electrically erasable programmable read only memory ($E^2$ PROM or Flash memory) or a magnetic desk. If the signals from line interface 12 are analog, a modem is placed between switch 16 and microprocessor 18. The modem enables microprocessor 18 to receive (and/or transmit) digital information in analog format.

The signals received by line interface 12 from communication channel 10 may be broken into two general categories. The categories are signaling signals and communication signals. Signaling signals consist of signals such as ring signals, tone signals or test signals. Test signals in an analog communication channel include signals such as transmission line measurement tones or signals, and DC line insulation/dielectric breakdown test voltage signals. Digital channels such as a DCP or ISDN communication channel, provide digital signaling signals such as ring signals, tone signals and test signals. The test signals can consist of digital signals that instruct the end terminal to perform a test such as a loop-back test. A loop-back test involves the end terminal simply echoing whatever communications are received over channel 10. The second group of signals are communication signals. Communication signals are the information carrying signals. In a conventional telephone, these communication signals are the voice signals that are provided to user interface 19. Communication signals may also include data signals which may be provided to a microcomputer or microprocessor.

The end terminal of FIG. 1 uses detector 14 to monitor signals received from communication channel 10 via line interface unit 12. Detector 14 may be implemented in a variety of well-known ways, for example, it may be implemented using an analog comparator to detect analog signaling signals, or a digital message processor or comparator to detect digital signaling signals. If a predetermined signaling signal is detected by detector 14, detector 14 sends a signal to microprocessor 18 which starts a timer. The timer may be executed using hardware, a software program executed by microprocessor 18, or a timer within microprocessor 18.

When detector 14 detects a predetermined signaling signal such as, for example, a digital test signal or an analog test signal, microprocessor 18 starts a timer. If a second signaling signal, such as a ring signal, is detected by detector 14 before the timer indicates that a predetermined amount of time has expired, microprocessor 18 moves switch 16 to position 22 and automatically establishes communication with the calling maintenance provider. The communication is carried out in accordance with any predetermined communications protocol. Switch 16 is returned to position 24 after the communication associated with the second signaling signal ends. If the second signaling signal is not received within the time allotted by microprocessor 18's timer, microprocessor 18 leaves switch 16 in position 24 so that any subsequent communications from communication 10 are passed to user interface 19.

The first signaling signal, such as a test signal, effectively arms the end terminal so that it may treat the next incoming communication as a maintenance or programming upgrade call. If the second signaling signal, such as a ring signal, occurs before the expiration of the time measured by microprocessor 18's timer, switch 16 is positioned at position 22 so that the incoming communication is provided to microprocessor 18. This permits microprocessor 18 to receive data, such as new programming for storage in memory 20, from an originating terminal or service provider without involving the end terminal user. If the ring signal preceding an incoming communication is provided outside the time window measured by microprocessor 18's timer, the communication is treated in a conventional fashion and passed via switch 16 to user interface 19. As a result, by simply refraining from sending the second signaling signal until after the predetermined time has elapsed, it is still possible to use the test signal for conventional testing without causing a change to the end terminal's program memory.

Figure 2:
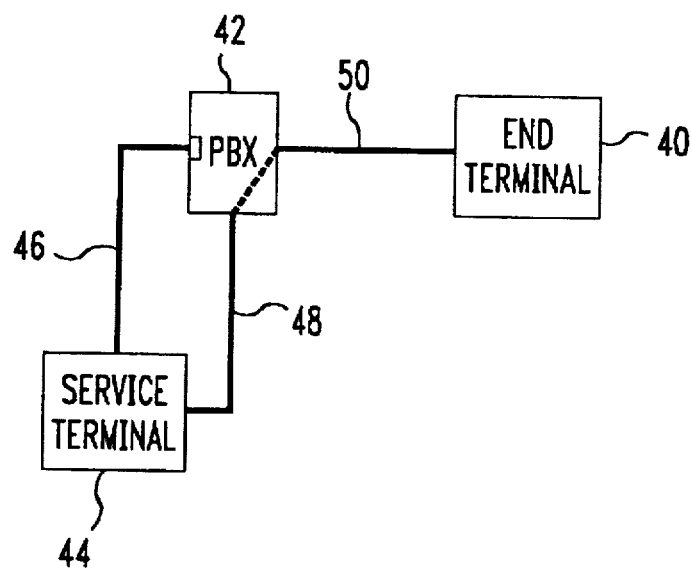
FIG. 2 illustrates a block diagram where a service provider terminal is used to access an end terminal through a switching system such as a PBX.

FIG. 2 illustrates a block diagram of a service terminal communicating with end terminal 40 through PBX (Private Branch Exchange) 42. This type of installation is typical in large buildings where end terminal 40 receives both communication signals and signaling signals from PBX 42. Service terminal 44 communicates with PBX 42 via communication paths 46 and 48. Communication path 46 provides communication between service terminal 44 and a control port of PBX 42. Communication channel 48 provides a conventional communication channel to PBX 42. PBX 48's switching function provides a communication path from service terminal 44 to end terminal 40 via communication channel 50. When an operator at service terminal 44 desires to update or perform maintenance on end terminal 40, the operator may use a modem to contact PBX 42 over communication channel 46 in order to instruct PBX 42 to provide a predetermined signaling signal to end terminal 40. This signaling signal may be a digital signal or a analog test signal as discussed earlier. The operator at service terminal 44 also instructs PBX 42 to activate a communication channel to end terminal 40 by providing a connection between communication channel 48 and communication channel 50, and by providing a ring signal to end terminal 40 within an amount of time which is less than the time period measured by microprocessor 18's timer. By executing these instructions, PBX 42 effectively arms end terminal 40 with the initial test signal or signaling signal, and then provides a second signaling signal, such as a ring signal, to automatically activate a communication channel between PBX 42 and end terminal 40 within the predetermined time measured by microprocessor 18's timer. Since the communication channel is activated within the predetermined amount of time, end terminal 40 uses the incoming data or communication signals from communication channel 50 to perform maintenance functions or software/firmware upgrades to its program storage memory.

It is possible for PBX 42 to be replaced by a central office switch of a local telephone company. It is also possible for communications channels 46, 48 and 50 to involve communication systems such as a long distance telephone network, a local area network or a wide area network.

I claim:

1. A method for processing information from a communications channel, comprising the steps of:

receiving a first signaling signal from a communications channel;

activating a timer in response to said first signal;

receiving a second signaling signal from said communications channel;

processing information received after said second signaling signal in a first way if said second signaling signal is received within a predetermined time period measured using said timer, said first way comprising storing said information in a program memory; and processing information received after said second signaling signal in a second way if said second signaling signal is received outside said predetermined time period measured using said timer, said second way comprising passing said information to a speaker.

2. An apparatus for processing information from a communications channel, comprising:

interface means for receiving signals from the communications channel;

detection means for detecting a first signaling signal received by said interface means;

timer means for measuring a predetermined length of time in response to said detection means detecting said first signaling signal; and switch means for routing information received from the communications channel to a first location having a program memory if a second signaling signal is received within said predetermined length of time, and for routing said information to a second location having a speaker if said second signaling signal is received outside said predetermined length of time.

* * * * *